United States Patent Office 3,183,184
Patented May 11, 1965

3,183,184
REMOVAL OF DISSOLVED OXYGEN FROM WATER
Sallie A. Fisher, Levittown, Pa., assignor to Rohm & Haas Company, Philadelphia, Pa., a corporation of Delaware
No Drawing. Filed Mar. 3, 1960, Ser. No. 12,510
13 Claims. (Cl. 210—26)

This invention relates to the removal of dissolved oxygen from water, particularly from deionized water. It has special reference to such removal by means of ion-exchange resins.

The invention concerns the use of the dithionite form of quaternary ammonium anion exchange resin, either as such or with the addition of a small amount of cobalt which acts as a catalyst to prevent fouling of the ion-exchange bed.

The corrosive properties of dissolved oxygen in water on metallic surfaces have long been known to industry. The wide-spread experience of industry has established that the rate of corrosion is directly proportional to the concentration of the dissolved oxygen in the water, and this rate increases as the temperature rises. The atomic power plants which have come into being in recent years have similarly encountered this problem and verified this relationship.

Until now, industry has dealt with this problem either by treating the water with a chemical reducing agent or by thermal deaeration or a combination of both. When dissolved solids in water are not of primary importance, such as in low pressure boilers, it has been the practice to utilize the chemical reducing agent; but when they are important, as in the case of high pressure boilers, the boiler feed water is first given a thermal deaeration and is then treated with a reducing agent, since water heated to 212° F. still contains about 0.4 p.p.m. of oxygen.

The prior art methods described above produce water which is quite acceptable in many applications, but there are a number of instances in which it is not acceptable, the atomic reactors being a notable example. Such reactors must have the highest quality water possible and cannot tolerate the ions which are perforce introduced in a chemical treatment. Up to now, no workable solution has been found to eliminate dissolved oxygen from water used in the cooling loops of atomic reactors. Since the water in those cooling loops is continually being deionized by beds of ion-exchange resins, it becomes convenient to remove oxygen via ion exchange if a feasible means for such removal is available.

The prior art has, in fact, known of the use of ion-exchange for removing oxygen from water. Calmon and Kressman in their book, Ion Exchangers in Organic and Biochemistry (Interscience Publishers Inc., New York, 1957), at page 31, disclose the use of copper or silver ions on a weakly basic anion-exchange resin which is then reduced to an easily oxidizable metallic form with alkaline sodium hydrosulfite. I have now found that a far more efficient oxygen-removing agent is the dithionite form of the strongly basic quaternary ammonium anion-exchange resins. A comparison of a dithionite and a sulfite resin bed, with regard to their respective oxygen-removing efficiencies, is shown in Example 1 which follows.

EXAMPLE 1

Two columns were set up, each having 200 ml. of a quaternary ammonium anion-exchange resin in the OH⁻ form. The resin employed was a styrene-divinylbenzene type known as Amberlite IRA-400, a product of the Rohm & Haas Company, Philadelphia, Pennsylvania (all of the Amberlite ion-exchange resins mentioned throughout the remainder of this specification are products of the same company). The resin in one column was regenerated with sodium dithionite and the other with sodium sulfite. The regeneration level in both cases was 0.5 milliequivalent (meq.) regenerant per 1.0 meq. anion-exchange capacity. Both columns were rinsed free of the residual reducing agent prior to exhaustion with deionized water made up to a pH of 9.3 and having a dissolved oxygen content of 7.8 p.p.m. Leakage from the dithionite column was only 0.1 p.p.m. dissolved oxygen. By comparison, the sodium sulfite regenerated column exhibited a leakage which went from 1 p.p.m. at 25 bed volumes to 2.5 p.p.m. at 150 bed volumes, thus proving quite clearly that sodium sulfite was not an efficient regenerant for oxygen removal. Although the superiority of the dithionite resin bed over the sulfite resin bed for the removal of oxygen has thus been established, in some situations it is not entirely practical to use the dithionite bed as such because of the formation of a precipitate, presumably sulfur, during the reaction which fouls the bed. Such fouling has been eliminated by the use of a cobalt catalyst during the reaction which permits the oxidation of the dithionite to proceed smoothly without any such interferences.

There are a number of ways in which the cobalt ion can be introduced to the anion resin component. One way is to add the cobalt directly to the resin in the column, using any suitable cobalt solution, or adding a solid material such as cobaltous chloride hexahydrate to the top of the ion-exchange bed. The cobalt additions, which actually are the same as regeneration of the resins with the cobalt compounds, could be done either in a column or batchwise operation.

The preferred method of introducing cobalt to the strongly basic anion-exchange resin involves the use of cation exchangers as "cobalt carriers." Sulfonic resins, such as Amberlite IR-120, and carboxylic resins, such as Amberlite IRC-50, each having been regenerated with a cobaltous solution, may be employed. In such instances, the dithionite is used to regenerate the anion-exchange resin bed, preferably to a 0.5 meq. dithionite per meq. anion capacity level. The resin was then rinsed free of excess reducing agent. Some actual experimental data which indicate the effectiveness of this method are set forth in Example 2 and Table I which follow.

EXAMPLE 2

Two columns were each packed with 200 ml. of Amberlite IRA-400 (OH⁻), one containing a top layer of 2% by volume of Amberlite IR-120 (Co⁺⁺), and the other containing a top layer of 5% by volume of Amberlite IR-120 (Co⁺⁺). Sodium dithionite was used to regenerate the bed to a 0.5 meq. dithionite per meq. anion capacity level. Both columns were rinsed free of the excess reducing agent and exhausted with pH 9.0 water.

*Table I*

Resin: 200 ml. Amberlite IRA-400 (OH⁻).
Catalyst: Various percentages of Amberlite IR-120 (Co⁺⁺) and Amberlite IRC-50 (Co⁺⁺).
Regenerant: Sodium dithionite.
Regenerant level: 0.5 meq./meq. resin anion capacity.
Exhaustion rate: 2 gal./ft.³/min.
Influent: pH 9.0, 7.8 p.p.m. dissolved oxygen.

| Catalyst | Resistance ($\Omega$) | Leakage (p.p.m.) | Removal capacity (g. $O_2$/ft.³ resin) |
|---|---|---|---|
| 2% IR-120 (Co⁺⁺) | >1,000,000 | .06–.08 | 99 |
| 5% IR-120 (Co⁺⁺) | >1,000,000 | .08–.18 | 99 |
| 2% IRC-50 (Co⁺⁺) | >1,000,000 | .08 | 55 |
| 5% IRC-50 (Co⁺⁺) | >1,000,000 | .08–.10 | 110 |

I have found that the dithionite-cobalt system described above works at almost any anion regeneration level. However, for maximum efficiency, i.e., to obtain the longest run at a minimum leakage, a bed which has been about 50–60% regenerated with dithionite is to be preferred, the remaining groups being in the hydroxide form. The ion-exchange beds may be used for a number of cycles after proper regeneration with the dithionite. In some instances, it may be desirable to employ a preliminary treatment with sodium hydroxide and then follow with the dithionite regeneration.

With regard to the cobalt which is employed in accordance with my invention, I have found it preferable to employ either cobalt hydrate or cobalt hexamine, although other cobaltous compounds will be satisfactory providing that they are properly introduced to the dithionite form of the quaternary anion-exchange resin. A comparison of the two preferred cobalt-catalyst systems is given in Example 3 and Table II which follow.

EXAMPLE 3

Two-hundred ml. of Amberlite IRA–400 (OH$^-$) were placed in each of the top sections of two columns. Each column was regenerated to 0.8 meq. sodium thionite per meq. anion capacity and then rinsed free of excess reducing agent. After rinsing, the volume of the resin was 180 ml. To the top of one column was added 18 ml. of Amberlite IRC–50 [Co(NH$_3$)$_6^{++}$] and to the other was added the same amount of Amberlite IR–120 (Co$^{++}$). Both anion beds were mixed to distribute the added cation resin uniformly. A water supply having a pH of 9.3 and a dissolved oxygen of 8.3 p.p.m. was used to exhaust these columns. The results of the analyses of the effluent from these columns is shown in Table II.

*Table II*

| Resin: 200 ml. Amberlite IRA-400(OH-). | 200 ml. Amberlite IRA-400(OH+). |
|---|---|
| Catalyst: 18 ml. Amberlite IRC-50 [Co(NH$_3$)$_6^{++}$]. | 18 ml. Amberlite IR-120 (Co$^{++}$). |
| Regenerant: Sodium dithionite. | Sodium dithionite. |
| Regeneration level: 0.8 meq./meq. anion capacity. | 0.8 meq./meq. anion capacity. |
| Exhaustion rate: 2 gal./ft.$^3$/min. | 2 gal./ft.$^3$/min. |
| Influent: pH 9.3 H$_2$O, dissolved oxygen 8.3 p.p.m. | pH 9.3 H$_2$O, dissolved oxygen 8.3 p.p.m. |

| 19 BED VOLUMES | | | 25 BED VOLUMES | | |
|---|---|---|---|---|---|
| Oxygen, p.p.m. | pH | Resistance, ohm-cm. | Oxygen, p.p.m. | pH | Resistance, ohm-cm. |
| 0.1 | 6.7 | 4,000,000 | 0.2 | 6.1 | 4,800,000 |
| 46 BED VOLUMES | | | 39 BED VOLUMES | | |
| 0.06 | 5.7 | 5,200,000 | 0.1 | 5.9 | 1,000,000 |
| 315 BED VOLUMES | | | 315 BED VOLUMES | | |
| 0.06 | 5.0 | 7,400,000 | 0.08 | 5.1 | 6,100,000 |
| 530 BED VOLUMES | | | 595 BED VOLUMES | | |
| 0.06 | 5.2 | 210,000 | 0.10 | 5.1 | 260,000 |

Should there be any of the customary electrolytes present such as is characteristic of low quality water (e.g., sulfates or chlorides), it is a simple matter to remove them either prior to or following the described treatments by use of deionizing mixed-bed ion-exchange resins in the conventional manner as illustrated in U.S. Patents 2,578,937 and 2,692,244. In fact, if desired, the dithionite-containing quaternary ammonium resin, with or without the cobalt catalyst, can even be mixed together with the anion- and cation-exchange resins that normally comprise conventional deionizing mixed beds of ion exchangers.

Other variations of the invention, all within the scope of the disclosure and claims hereof, will of course suggest themselves to those skilled in the art.

I claim:

1. The process of removing dissolved oxygen from water which comprises bringing the water into contact with the dithionite form of a quaternary ammonium anion-exchange resin.

2. The process of removing dissolved oxygen from water which comprises bringing the water into contact with a quaternary ammonium anion-exchange resin having functional groups approximately one-half of which are in the hydroxide form and the remainder are in the dithionite form.

3. The process of claim 1 in which the resin contains cobalt in addition to its dithionite functional groups.

4. The process of claim 2 in which the resin contains cobalt in addition to its dithionite and hydroxide functional groups.

5. A composition for removing dissolved oxygen from water which comprises a quaternary ammonium anion-exchange resin having functional groups of which approximately one-half are in the hydroxide form and the remainder are in the dithionite form.

6. The composition of claim 5 in which the resin contains cobalt in addition to its dithionite and hydroxide functional groups.

7. A composition for removing dissolved oxygen from water which comprises a quaternary ammonium anion-exchange resin having at least half of its functional groups in the dithionite form and any remainder in the hydroxide form, and the cobalt form of a cation-exchange resin.

8. The composition of claim 7 additionally containing a deionizing mixture of anion- and cation-exchange resins.

9. The process of removing dissolved oxygen from water which comprises flowing the water down through a column whose uppermost layer is the cobalt form of a cation-exchange resin which previously had been regenerated with a dithionite salt solution, and whose next lower layer is a quaternary ammonium anion-exchange resin in the hydroxide form.

10. The process of removing dissolved oxygen from water which comprises passing the water over a deionizing mixed bed of anion- and cation-exchange resins, then over the cobalt form of a cation-exchange resin which previously had been regenerated with a dithionite salt solution, and then over a quaternary ammonium anion-exchange resin in the hydroxide form.

11. The process of removing dissolved oxygen from water which comprises passing the water over the cobalt form of a cation-exchange resin which previously had been regenerated with a dithionite salt solution, then over a quaternary ammonium anion-exchange resin in the hydroxide form, and then over a deionizing mixed bed of anion- and cation-exchange resins.

12. The process of removing dissolved oxygen from water which comprises passing the water over a mixture comprised of the cobalt form of a cation-exchange resin which previously had been regenerated with a dithionite salt solution, together with an anion- and a cation-exchange resin which pair normally functions as a deionizing mixed ion-exchange bed.

13. A composition for removing dissolved oxygen from water which comprises a mixture of a cobalt compound and a quaternary ammonium anion-exchange resin having dithionite ions on its exchange sites.

References Cited by the Examiner
UNITED STATES PATENTS

| | | | |
|---|---|---|---|
| 2,515,609 | 7/50 | Mills | 210—59 |
| 3,051,651 | 8/62 | Haagen | 210—32 |

OTHER REFERENCES

Sansoni: "Use of Ion Exchange Resins as Electrol Exchanger," Die Naturwissenschaften, vol. 39, No. 12, 1952, page 281.

MORRIS O. WOLK, *Primary Examiner*.